May 14, 1963 C. O. GLASGOW 3,089,338
LEVEL GAGE
Filed Aug. 23, 1960 2 Sheets-Sheet 1

INVENTOR.
CLARENCE O. GLASGOW
BY Arthur L. Wade
ATTORNEY

May 14, 1963     C. O. GLASGOW     3,089,338
LEVEL GAGE

Filed Aug. 23, 1960     2 Sheets-Sheet 2

INVENTOR.
CLARENCE O. GLASGOW

BY *Arthur L Wade*

ATTORNEY

United States Patent Office 3,089,338
Patented May 14, 1963

3,089,338
LEVEL GAGE
Clarence O. Glasgow, Tulsa, Okla., assignor to National Tank Company, Tulsa, Okla., a corporation of Nevada
Filed Aug. 23, 1960, Ser. No. 51,356
3 Claims. (Cl. 73—324)

The present invention relates to level gages. More specifically, the invention relates to sight gages with which liquid levels within pressure vessels are directly viewed from a point external the vessel.

Tempered glass, or other transparent material, is available for mounting through the walls of pressure vessels in order to visually inspect their interiors. The larger the area provided by these viewing windows in the walls of pressure vessels, the more complex their mountings. The smaller, more compact, structures are quite limited in the viewing area they provide. However, the small, simple insert type of sight glass has the advantage of being readily mounted and being highly resistant to temperature and pressure. An arrangement is desired for these small sight glasses which will provide observation of a liquid level over a range of variation which exceeds the dimensions of a single such window. Further, an arrangement is desired for these simple forms of sight glass windows which will enable them to be mounted on a common flange which also mounts a level control instrument. Keeping the interior surface of these small sight glasses cleaned of foreign matter becomes still another problem and is solved by the present invention.

A primary object of the present invention is to provide an arrangement for a series of simple, relatively small, sight glass windows which will provide observation of a liquid level in a vessel over a range which exceeds the vertical dimension of a single window.

Another object is to provide an arrangement and mounting for a series of small sight glass windows on a flange which also mounts a primary element responsive to the liquid level.

Another object is to provide a reflecting surface behind the windows as a background for the liquid level viewed through the window.

Another object is to provide for cleaning foreign matter from the interior surfaces of the windows for accurate observation of the liquid level through the windows.

The present invention contemplates a series of transparent bodies mounted through a flange which is itself sealed at its edges over a vessel opening. The bodies, as sight glass windows, are spaced in a vertically staggered relation to each other so the level may be under substantially continuous observation from a point external the vessel as the level varies progressively across the surfaces of adjacent windows.

The invention further contemplates the transparent bodies, as simple sight glass windows, being mounted on a common flange. The flange is also adapted to mount a primary element which directly responds to the observed level.

The invention further contemplates the transparent bodies given the form of simple conical frustums mounted to flare inwardly to the vessel interior whereby the vessel pressure will aid in sealing the bodies in their respective holes through the flange. Further, the bodies may be mounted on a circle about the flange center. The primary element responding to level which may be mounted on the flange will extend through the flange center. A polished disc is then mounted on the interior of the flange and spaced from the windows so that as the liquid level rises and falls between the disc and the windows the disc surface provides a reflecting background for the liquid level.

The invention further contemplates mounting a resilient wiper body between the reflecting surface and the windows. The wiper body can be manipulated from external the vessel to simultaneously remove foreign matter from the interior surface of the transparent bodies and the reflecting surface to maintain the view of the liquid level accurate.

Other objects, advantages and features of this invention will become apparent to one skilled in the art upon consideration of the written specification, appended claims, and attached drawings wherein;

*Gage-Vessel Relation*

Figure 1:
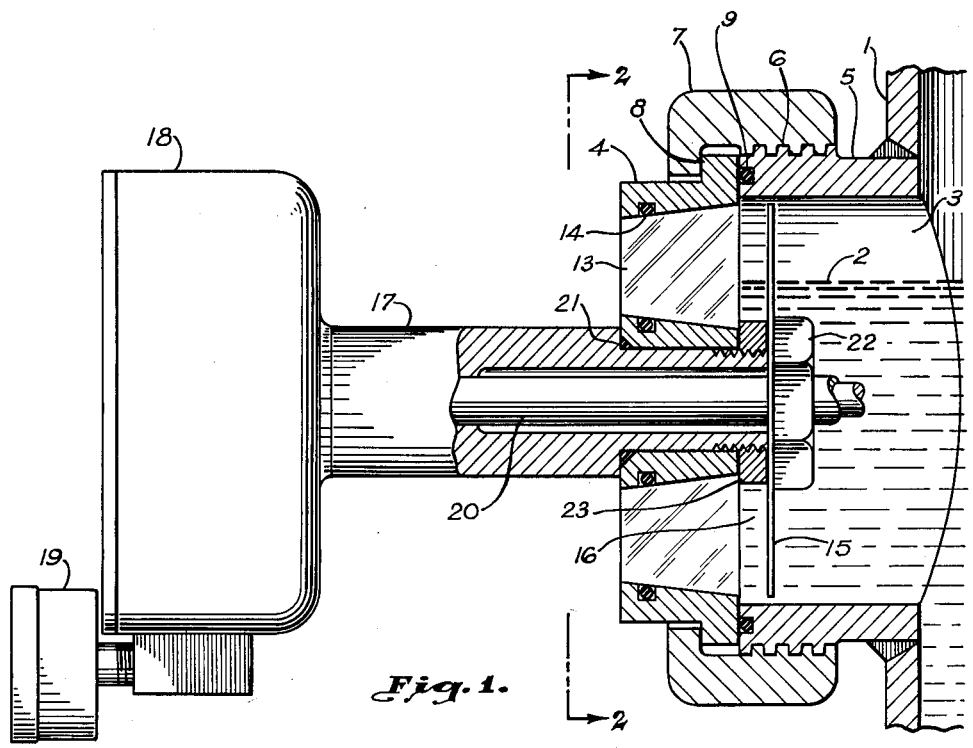
FIG. 1 is a partially sectioned side elevation of a sight gage mounted on a vessel and in which the present invention is embodied.

Referring to FIG. 1, there is depicted a portion of a wall of vessel 1 in which a liquid level 2 is maintained. The present invention is employed where the level 2 is controlled within a predetermined range. An opening, having a vertical height spanning the predetermined range of level, is made in the wall of vessel 1. This access port 3 is then provided with structure embodying the invention for visually observing the level 2 from a point external vessel 1.

A flange-disc 4 is mounted over port 3, sealed at its edges to the port. More specifically, a conduit 5 is welded into port 3 to extend horizontally therefrom. This conduit-collar 5 is provided with coarse threads 6 with which to engage a union 7, the said union capturing flange-disc 4 over the external end of conduit-collar 5.

*Mounting Base for Gage*

Flange-disc 4 is held with its plane vertically extended, sealed by its edges to the end of collar 5. Union 7 captures an offset shoulder 8 of flange 4 and O-ring 9 provides a fluid-type sealed between the external end of conduit 5. O-ring 9 is mounted in a groove on the end face of collar 5.

*Viewing Windows*

Figure 2:
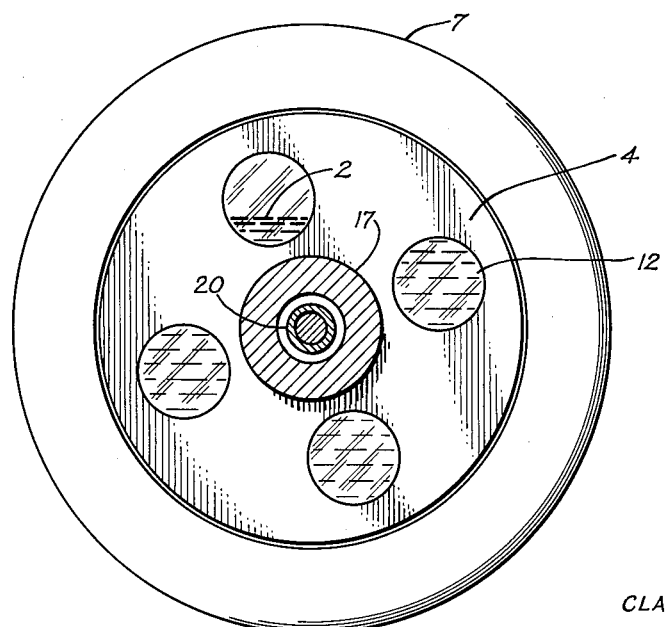
FIG. 2 is a section along lines 2—2 in FIG. 1.

FIG. 2 is to be taken with FIG. 1 in disclosing openings which are extended horizontally through the flange-disc 4 to give a continuous view of the level 2 as the level 2 varies across the surface of the highest opening and the surface of the lowest opening. Openings 12 are spaced in a vertically staggered relation with respect to each other to provide a substantially continuous view of the level as the level varies over its predetermined range. FIG. 2 illustrates this vertical staggering arrangement to best advantage. In FIG. 2, the openings 12 are shown as evenly distributed on a circle about the center of the disc-flange 4. The disc-flange 4 is then rotated to orient the holes so that the level, at its highest point, may be viewed through one opening 12 and then viewed through successive openings as the level 2 falls to its minimum height.

The openings 12 have transparent bodies sealed in them. These transparent bodies may be of some form of tempered glass, or other transparent material, which will withstand the pressure and temperature within vessel 1.

Transparent bodies 13 are in the form of conical frustums. A groove in the wall of the openings 12 accommodates an O-ring 14 which seals between the opening wall and a transparent body 13 inserted in the opening 12. The conical frustum shape given the inserts 13 are matched by the shape of the opening 12 and oriented so that the holes in which they are mounted flare inwardly of the vessel 1. Therefore, the higher pressure within vessel 1 will tend to seat the transparent bodies 13 firmly against sealing ring 14 in the walls of their holes 12. Further, the wall of each hole will give support to the insert oriented within that hole all along the wall of the insert. The combination of uniform support of the insert, together with the angle of inward flare given the hole 12 and insert, obviates the pressure which is seating the insert from internally fracturing the insert material and obstructing the view through the material.

Reflecting Surface

The visual observation of level 2 from a point external of vessel 1 is based on reflected light. With no reflecting surface immediately available on the side of transparent bodies 13 facing the vessel interior, level 2 will not be visible. Therefore, a light reflecting body is needed, mounted within the vessel and spaced from the insert bodies, to permit the liquid level 2 to fluctuate between the insert bodies 13 and the light reflecting body. Reflector disc 15 functions to carry out this objective.

Reflector disc 15 is preferably made of stainless steel, polished to give good light reflecting qualities behind the inserts 13. The relationship between reflecting disc 15 and inserts 13 is observed in FIG. 1. A space 16 is provided between the disc and inserts so that level 2 will readily rise and fall between them without developing a meniscus which would obscure the true level.

Mount for Disc 15

A structure is provided with which to mount disc 15 within collar 5 to function in the manner required. FIG. 1 partially illustrates a control instrument mounted at the center of flange-disc 4. Adapter collar 17 is the base for mounting this indicator-controller structure. The complete control structure is not illustrated. Oriented on adapter collar 17 is control box 18 in which is mounted a fluid pressure couple. A gage 19 indicates control fluid pressure developed by a couple within housing 18 which is representative of the level 2 detected by the instrument. Support rod 20 extends from the outer end of adapter collar 17 and into vessel 1 in order to mount the primary element within vessel 1 which will respond to level 2.

Adapter collar 17 is sealed to a central hole in disc-flange 4 through an O-ring 21. The end of adapter collar 17 within the vessel is threaded to receive a nut 22 which captures reflecting disc 15 on a spacer 23. Many forms of structure equivalent to that disclosed, for the purposes of mounting reflector disc 15, are conceivable. In FIG. 2 is illustrated how the control instrument extending through the center of disc-flange 4 serves the further purpose of providing the mounting for reflector-disc 15.

With the foregoing combination of structure, the invention provides a simple flange-mounted structure for mounting viewing windows of simple form in a pattern to provide substantially continuous observation of liquid level as it varies between predetermined limits. Additionally, the invention in this arrangement and structure provides a common mounting for the sight glass, compactly arranged about an instrument which detects and controls the level observed.

Cleaning Structure

Figure 3:
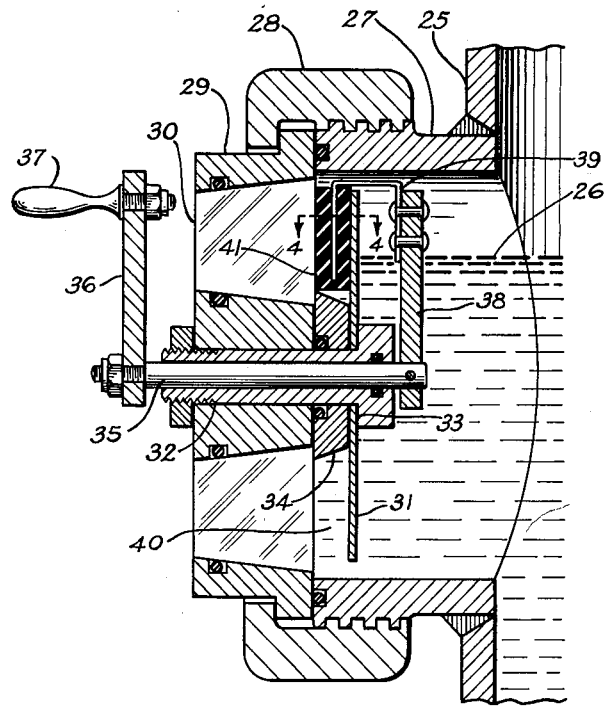
FIG. 3 is a partially sectioned side elevation of the sight gage of FIG. 1 with a cleaning structure mounted on the gage.
Figure 4:
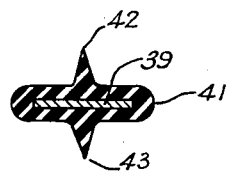
FIG. 4 is a section along lines 4—4 in FIG. 3.

FIGS. 3 and 4 disclose manually operated structure with which a viewer external the vessel can periodically clean both the viewing windows and reflecting surface of the level gage. FIG. 3 shows a portion of a vessel wall 25, a level 26, conduit-collar 27, union 28 and flange 29 which are quite similar to the disclosure in FIGS. 1 and 2. Flange 29 has transparent insert bodies 30 mounted through it to carry out the objects of the invention in the same manner bodies 13 carry out objects of the invention.

Flange 29 has a structure mounted through its center for wiping off the interior face of window inserts 30. This same structure mounts reflector disc to function as disc 15 functions in FIG. 1.

Specifically, shaft 32 is journalled through a central hole of flange 29. The interior end of shaft 32 has a shoulder 33 which captures both disc 31 and spacer 34 against the internal face of flange 29. Note, against the internal face of flange 29, spacer 34 has a diameter which overlaps insert windows 30 to keep them in place. Spacer 23 functions in this same manner in FIG. 1.

Through the bore of shaft 32, rotatable shaft 35 is extended. The external end of shaft 35 carries a crank arm 36 and handle 37 to rotate shaft 35. The internal end of shaft 35 carries a wiper arm 38. Mounted on the end of wiper arm 38 is a U-shaped wiper bracket 39 extending down into space 40 between disc 31 and the faces of window inserts 30.

Over bracket 39 is slipped a resilient member 41, preferably of rubber, shaped as disclosed in FIG. 4. The moulded shape of sleeve member 41 provides edges 42 and 43. One of these edges contacts a substantial portion of the diameter of the internal face of inserts 30 while the other edge contacts the opposite surface of disc 31. Rotation of this structure wipes and cleans foreign matter from both windows and reflector when rotated by handle 36.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A level gage for liquids within a closed pressure vessel including,
    a pressure vessel in which liquid is to be maintained at a level within predetermined limits,
    an access port in the side of the vessel positioned at a height which will span the range of level variation,
    a flange-disc mounted over the port,
    means for sealing the edges of the flange-disc to the port,
    a level-detecting instrument extending through the center of the flange-disc and mounted thereon,
    transparent insert bodies mounted through openings spaced on a circle about the center of the flange-disc and related to the vertical so as to give a substantially continuous view of the level from a point external the vessel,
    and a reflector disc mounted on the instrument extending through the center of the flange-disc and spaced behind the bodies and within the vessel so the liquid level in front of the disc may be clearly and substantially continuously viewed through the transparent bodies.

2. A liquid level sight gage including,
    a pressure vessel in which liquid is maintained at a level within predetermined limits,
    a flange-disc sealed through the vessel wall at the edges of the flange-disc,
    transparent body inserts mounted through openings spaced on a circle about the center of the flange-disc so as to give a substantially continuous view of the level from a point external the vessel,
    a rotatable shaft mounted through a fluid tight seal at the center of the flange-disc,
    a reflector disc mounted within the vessel and spaced from the body inserts so the liquid level between the disc and inserts may be clearly and substantially continuously viewed as it fluctuates within the predetermined limits, a resilient wiper structure mounted on the internal end of the shaft arranged to contact both the reflector surface and the internal face of the body inserts as the shaft rotates, and a handle mounted on the external end of the shaft with which to manually rotate the wiper structure and simultaneously clean the reflector and body inserts.

3. A level gage for liquids within a closed pressure vessel including, a pressure vessel in which liquid is to be maintained at a level within predetermined limits, an access port in the side of the vessel positioned at a height which will span the range of level variation, a flange-disc mounted over the port, means for sealing the edges of the flange-disc to the port, an instrument for detecting level mounted at the center of the flange-disc and extending through the flange-disc to connect with a primary element sensing level within the vessel, and transparent insert bodies mounted through openings spaced on a circle about the center of the flange-disc and related to the vertical so as to give a substantially continuous view of the level from a point external the vessel, whereby the level detected is substantially continuously observed as it varies over a finite vertical range extending above and below the center of the flange-disc.

References Cited in the file of this patent

UNITED STATES PATENTS

| | | |
|---|---|---|
| 798,656 | Bosworth | Sept. 5, 1905 |
| 1,127,084 | Ogilvie et al. | Feb. 2, 1915 |
| 1,142,540 | Talmage | June 8, 1915 |
| 1,189,922 | Daly | July 4, 1916 |
| 1,408,218 | Martin | Feb. 28, 1922 |
| 1,880,847 | Daly | Oct. 4, 1932 |
| 2,357,753 | Matuszak | Sept. 5, 1944 |
| 2,680,874 | Mitchell | June 15, 1954 |

FOREIGN PATENTS

| | | |
|---|---|---|
| 12,057 | Great Britain | 1902 |
| 514,133 | Great Britain | Oct. 31, 1939 |
| 463,144 | Canada | Feb. 14, 1950 |